United States Patent
Park (10) Patent No.: US 9,936,244 B2
(45) Date of Patent: Apr. 3, 2018

(54) APPARATUS FOR PROVIDING AN IDENTIFICATION SERVICE OF A FORCE INPUT AND METHOD FOR PERFORMING THE SAME

(71) Applicant: HUMAX CO., LTD., Yongin (KR)

(72) Inventor: Sung Heum Park, Yongin (KR)

(73) Assignee: HUMAX CO., LTD., Yongin (KR)

(*) Notice: Subject to any disclaimer, the term of this patent is extended or adjusted under 35 U.S.C. 154(b) by 0 days.

(21) Appl. No.: 15/254,917

(22) Filed: Sep. 1, 2016

(65) Prior Publication Data
US 2017/0302987 A1    Oct. 19, 2017

(30) Foreign Application Priority Data
Apr. 19, 2016  (KR) .................. 10-2016-0047563

(51) Int. Cl.
*H04N 5/44*   (2011.01)
*H04N 21/422*   (2011.01)

(52) U.S. Cl.
CPC . *H04N 21/42222* (2013.01); *H04N 21/42226* (2013.01)

(58) Field of Classification Search
CPC .................. H04N 21/42222; H04N 21/42226
USPC ........................................................ 348/734
See application file for complete search history.

(56) References Cited

U.S. PATENT DOCUMENTS

| | | | | |
|---|---|---|---|---|
| 2009/0201260 A1* | 8/2009 | Lee | ...................... | G06F 3/04883 345/173 |
| 2011/0248948 A1* | 10/2011 | Griffin | ..................... | G06F 3/041 345/174 |
| 2013/0155018 A1* | 6/2013 | Dagdeviren | ........ | G06F 3/03543 345/174 |

FOREIGN PATENT DOCUMENTS

| KR | 10-2007-0110114 A | 11/2007 |
|---|---|---|
| KR | 10-2010-0014095 A | 2/2010 |

* cited by examiner

*Primary Examiner* — Michael Lee

(57) ABSTRACT

An image processing terminal comprising: a processor, a memory for storing one or more commands executed by the processor, and a control signal receiving unit for receiving a control signal in accordance with an input to a key by a user from a remote controller. The one or more program commands include commands for, comparing a sensing level corresponding to a pressure or an area applied to the key by the user with a preset value, determining whether the input to the key corresponds to a normal input or a force input depending on the comparing, outputting an identification image for identification of the force input on a screen during a predetermined period of time or adjusting a full size of the screen when the input to the key corresponds to the force input, and performing a control process corresponding to the force input after the predetermined period of time elapses.

10 Claims, 7 Drawing Sheets

APPARATUS FOR PROVIDING AN IDENTIFICATION SERVICE OF A FORCE INPUT AND METHOD FOR PERFORMING THE SAME

PRIORITY

This application claims priority under 35 U.S.C. §119(a) to a Korean patent application filed on Apr. 19, 2016 in the Korean Intellectual Property Office and assigned Serial No. 10-2016-0047563, the entire disclosure of which is incorporated herein by reference.

BACKGROUND

1. Field of the Invention

The present disclosure relates to an apparatus for providing an identification service of a force input and a method for performing the same. More particularly, the present disclosure provides an apparatus for providing various services through a force input of a single key by a user though a remote controller has few key and a method for performing the same.

2. Description of the Related Art

A set-top box is connected to a television, converts properly a video signal and a voice signal received from an external device and displays an image corresponding to the converted video and voice signal through the television.

The set-top box receives an IPTV signal, a cable TV signal, a satellite TV signal or a general signal for broadcasting, and the set-top box displays the received signal on the television.

The set-top box generally interoperates with a wired or wireless remote controller. A user remotely controls the set-top box with the remote controller.

Functions of the set-top box or the television are diversified as types of contents and services provided from an IPTV, a cable TV or a satellite TV have been diversified. The number of buttons in the remote controller controlling the set-top box or the television has increased due to the diversification of the functions.

It is preferable to provide various contents and services to the user, but the user need to know a function of each button in the remote controller in order to fully enjoy the various contents and services provided.

It becomes difficult for the user to control the remote controller with keeping the user's eyes toward the television (blind control) as the remote controller has lots of buttons. Additionally, there are many factors distracting user's view when the user controls the remote controller. For example, the user should look at the remote controller and select a relevant button whenever the user wants to properly control the remote controller.

A demand for a remote controller having few or no button has been on the rise. Since a conventional remote controller does not satisfy such demand, a system and method for controlling the remote controller minimizing the number of the buttons in the remote controller is needed while allowing the user to enjoy a variety of contents and services. With the remote controller having few or no button, the user may easily figure out how to use the remote controller and it also enables the user to perform the blind control when using the remote controller.

Additionally, an apparatus for processing a control signal received from the remote controller has been required, if the remote controller performable the blind control uses.

SUMMARY

The invention has been made to address at least the disadvantages and problems described above, and to provide at least the advantage described below. An aspect of the invention provides an apparatus, for providing an identification service of a force input, for providing various media services through the force input though a remote controller has few key and enabling a user to visually identify the force input, and a method for performing the same.

According to one embodiment of the invention, an image processing terminal, comprising: a processor; a memory configured to store one or more commands executed by the processor; and a control signal receiving unit configured to receive a control signal in accordance with an input to a key by a user from a remote controller. Here, the one or more program commands include commands for, comparing a sensing level corresponding to a pressure or an area applied to the key by the user with a preset value, determining whether the input to the key corresponds to a normal input or a force input depending on the comparing, outputting an identification image for identification of the force input on a screen during a predetermined period of time or adjusting a full size of the screen when the input to the key corresponds to the force input, and performing a control process corresponding to the force input after the predetermined period of time elapses.

The one or more program commands output the identification image in a zoom-out on a certain area of the screen during a waiting time for execution of an operation in accordance with the force input.

The one or more program commands reduce a full size of the screen in a direction of z-depth during a waiting time for execution of an operation in accordance with the force input, and then returns the size of the screen to an original size.

The one or more program commands display separately an entity applicable the force input from an entity applicable only the normal input corresponding to a pressure or an area applied to the key by a value less than the preset value when a cursor moves, in the event that plural entities selectable through a movement of the cursor are displayed on the screen.

The one or more program commands allow the identification image to include information for identifying a function executed by the force input.

The one or more program commands display an icon, corresponding to a function selectable through a normal input of a navigation key, near the identification image on the screen.

The image processing terminal is a set-top box for receiving a broadcasting signal from a contents providing system and outputting the received broadcasting signal.

The key includes at least one of a navigation key related to a directional key, a determination key or a function key, and the one or more program commands execute an operation corresponding to an attribute different from an original attribute of a selected key, when the key is selected by a sensing level corresponding to a pressure or an area more than a preset pressure or area.

The sensing level includes a first sensing level corresponding to the normal input for executing an operation corresponding to an original attribute of the key and a second sensing level corresponding to the force input for executing an operation corresponding to an attribute different from the original attribute of the key.

In another embodiment of the invention, a method for providing a force input identification service comprising:

receiving a control signal in accordance with an input to a key by a user from a remote controller; comparing a sensing level corresponding to a pressure or an area applied to the key by the user with a preset value, and determining whether the input to the key corresponds to a normal input and a force input depending on the comparing; outputting an identification image for identification of the force input on a screen during a predetermined period of time or adjusting a full size of the screen when the input to the key corresponds to the force input; and performing a control process corresponding to the force input to the key after the predetermined period of time elapses.

In still another embodiment of the invention, a program stored in a recording medium to be read by a computer and for performing the method is disclosed.

According to the invention, a user may visually verify a force input when a remote controller provides the force input, and thus the user may recognize in advance that he can access various services.

BRIEF DESCRIPTION OF DRAWINGS

The aspects, features, advantages and embodiments of the invention will be more apparent from the following detailed description taken in conjunction with reference to the accompanying drawings, in which.

DETAILED DESCRIPTION

In the present specification, an expression used in the singular encompasses the expression of the plural unless it has a clearly different meaning in the context. In the present specification, terms such as "comprising" or "including," etc., should not be interpreted as meaning that all of the elements or operations are necessarily included. That is, some of the elements or operations may not be included, while other additional elements or operations may be further included. Also, terms such as "unit," "module," etc., as used in the present specification may refer to a part for processing at least one function or action and may be implemented as hardware, software, or a combination of hardware and software.

Hereinafter, various embodiments of the invention will be described in detail with reference to accompanying drawings.

Figure 1:
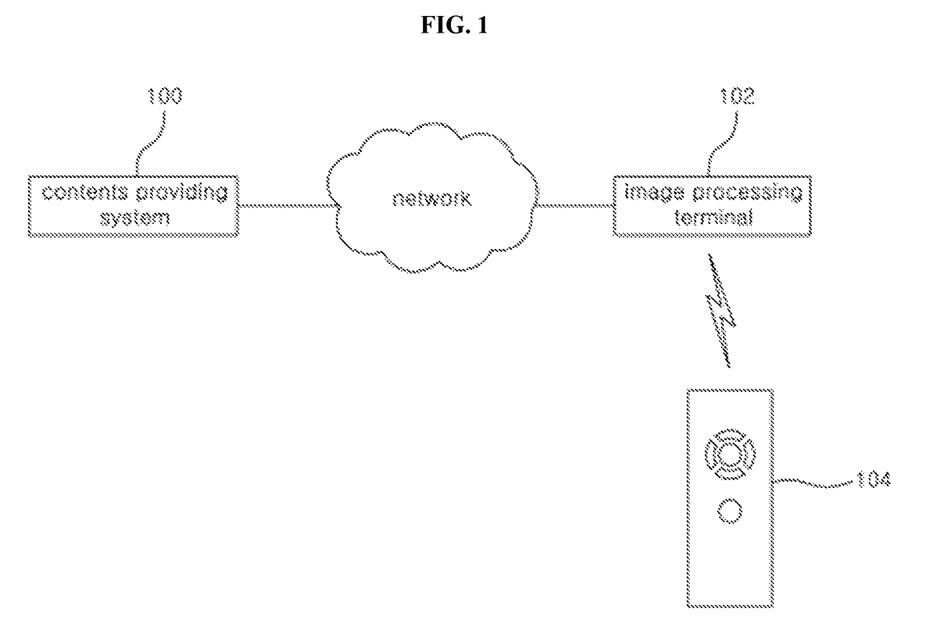
FIG. 1 is a view illustrating a system for providing a media service according to one embodiment of the invention.

FIG. 1 is a view illustrating a system for providing a media service according to one embodiment of the invention.

In FIG. 1, the system for providing the media service of the present embodiment may include a contents providing system 100 and an image processing terminal 102 connected to the contents providing system 100 through a network.

A media according to the invention may include a live program provided by a broadcasting provider, a video on demand program, a game, a shopping, etc., but it is not limited.

An apparatus for providing a media service according to the present embodiment may be defined as the image processing terminal in that it outputs contents including an image which is received through a network or stored in advance.

Hereinafter, it is assumed for convenience for description that the apparatus for providing the media service is a broadcasting terminal receiving contents provided by the broadcasting provider. However, the apparatus for providing the media service may be every image processing terminal as long as the image processing terminal is connected to the remote controller for controlling a media service by using a plurality of sensing levels set to one key.

The contents providing system 100 may be a headend in view of a broadcasting service, and provides a live program or a video on demand program according to a preset schedule.

The contents providing system 100 converts an audio and video signal (AV signal) about various broadcasting channels into a broadcasting signal with a predetermined format, and transmits the converted broadcasting signal to the image processing terminal 102.

Furthermore, the contents providing system 100 may include an extra communication server (for example, a return path server) for processing user's request through an upstream channel, and provide an Internet service and a variety of communication services.

The image processing terminal 102 receives a control signal from a remote controller 102 located near place and executes receiving and outputting of contents from the contents providing system 100 and the other operation according to the received control signal. Additionally, the image processing terminal 102 changes a screen.

The image processing terminal 102 may be a television or a set-top box. However, the image processing terminal 102 may include every terminal as long as the terminal can receive contents through the network and receive the control signal from the remote controller 102.

In one embodiment, the control signal received from the remote controller 104 to the image processing terminal 102 may include information concerning a key selected by the user and information concerning a sensing level corresponding to a pressure or an area applied to the key by the user.

A control signal of a conventional remote controller includes only information concerning a key. Whereas, the control signal of the remote controller 104 according to the present embodiment further includes the information concerning one of sensing levels set to the key.

Accordingly, the image processing terminal 102 may perform a different control process in response to a sensing level corresponding to a pressure or an area applied to a selected key though the same key is selected.

The information concerning the key may be key identification information in the event that a key pad is implemented with physical structure in the remote controller 104. The information concerning the key may be coordinate information of the key in the event that the key is implemented by software because the remote controller has a touch screen.

Preferably, the image processing terminal 102 identifies contents being presently displayed and performs a control process corresponding to the identified contents and a received control signal, when it receives the control signal including the information concerning the key and the information concerning the sensing level from the remote controller 104.

Figure 2:
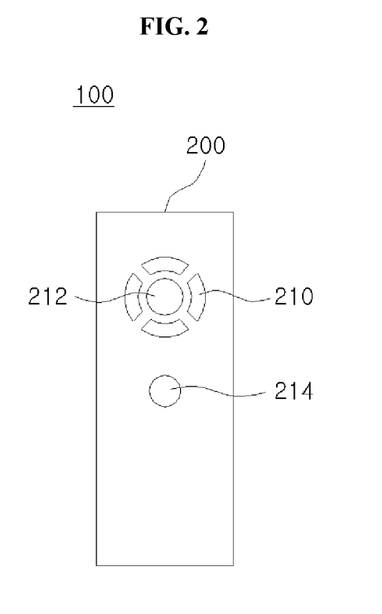
FIG. 2 is a view schematically illustrating a remote controller according to one embodiment of the invention.
Figure 3:
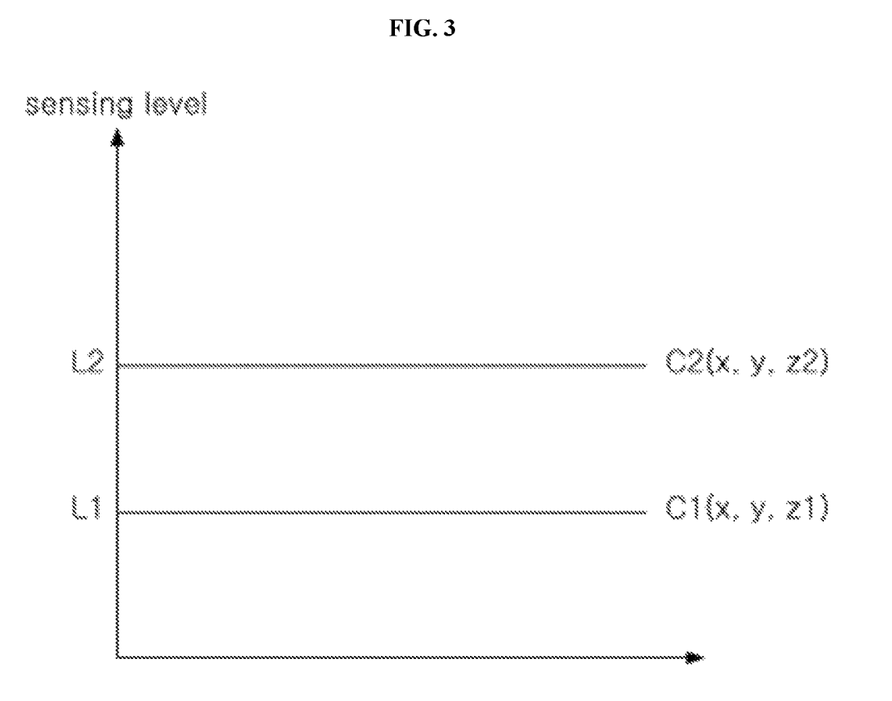
FIG. 3 is a view illustrating a control operation of a remote controller according to one embodiment of the invention.

FIG. 2 is a view schematically illustrating a remote controller according to one embodiment of the invention, and FIG. 3 is a view illustrating a control operation of a remote controller according to one embodiment of the invention. FIG. 2 shows the remote controller including keys implemented by software through the touch screen.

As shown in FIG. 2, the remote controller 104 may include a body 200, a navigation key 210 including up, down, left, or right directional keys, a function key 214 for performing a variety of operations such as an esc key, a home menu selection key, a guide selection key, a playing back control key for fast forward/rewind/stop/play, etc., and a determination key 212 for determining an operation such as an OK key(a selection key or a verification key), etc. or a selection of a program. On the other hand, various keys other than the navigation key 210, the determination key 212 and the function key 214 may exist in the remote controller 100. The various keys may be classified as the navigation key 210, the determination key 212 and the function key 214.

The remote controller 104 may transmit a control signal, for performing a different operation according to pressure or an area applied to the key pressed or touched by using a touch means to the image processing terminal 102. The touch means may include a finger and any input device. Here, a sensing level of the remote controller 100 differs according to the pressure or the area applied to the key, and thus the remote controller 100 may transmit a different control signal to the image processing terminal 102 depending on the sensing level of the key.

An input to the remote controller 104 by the touch means may include a normal input and a force input. The normal input means an input pressed generally by a user. In this case, a general operation set to the key of the remote controller is performed like an operation of the key of the remote controller in conventional technique.

For example, an up operation is performed when an up key is pressed or touched. The force input means an input to the key when the key is pressed or touched with higher pressure or wider area than the normal input. In this case, a control process of the image processing terminal 102 is different from that of the image processing terminal 102 in the normal input. On the other hand, though a long press is applied under the normal input, the long press may not be regarded as the force input but be recognized as the normal input.

In addition, a plurality of force inputs are set, and this will be described in detail below.

In another embodiment, if the key of the remote controller 104 selected by the touch means has a coordinate (x, y), the information concerning the sensing level may be expressed in a z axis. That is, both the coordinate of the selected key and the sensing level may be expressed in a three-dimensional coordinate (x, y, z). However, other methods may be used to express the coordinate and the sensing level of the selected key. For example, four or more dimensional coordinate may be used.

Accordingly, in the event that the user selects a specific key with a specific sensing level, the remote controller 104 may transmit the control signal including the coordinate (x, y) corresponding to the specific key and a coordinate (z) related to the sensing level to the image processing terminal 102. That is, the remote controller 104 may transmit the control signal C(x, y, z) to the image processing terminal 102.

For example, when the user selects the navigation key 210 corresponding to a right directional key with a first sensing level (normal input), the remote controller 104 may transmit a control signal C1 having a coordinate (x, y, z1) to the image processing terminal 102. When the user presses the navigation key 210 with higher pressure, e.g. selects the navigation key 210 with a second level (force input), the remote controller 104 may transmit a control signal C2 having a coordinate (x, y, z2) to the image processing terminal 102.

In this time, the image processing terminal 102 performs different control process according to the control signal.

For example, the image processing terminal 102 outputs detailed information (for example, broadcasting time, etc.) about a program being presently viewed or information about a program provided at adjacent channel, when the normal input is applied to the determination key 212 while the user are viewing a live program.

The image processing terminal 102 may output a live program guide such as a guide about a live program, a popular program list, a favorite channel list or a recent viewing channel list, when the force input is applied to the determination key 212 while the user are viewing the live program.

Generally, an output of the popular channel list, the favorite channel list and the recent viewing channel list is implemented through a selection of the function key 214 in the remote controller or a selection of a menu corresponding to a lower depth in a home menu.

In one embodiment, a process when the force input is applied to the determination key 212 may be similar to that when the force input is applied to the function key 214. Moreover, the user gets a desired service though few key is provided.

The force input of the present embodiment may give an attribute of the function key 214 to the determination key 212. Of course, an operation corresponding to an attribute different from an attribute of the navigation key 210 may be executed when the force input is applied to the navigation key 210.

In another embodiment, one of the guide, the popular channel list, the favorite channel list and the recent viewing channel list may be selectively outputted, depending on each of the sensing levels set to the determination key 212.

For example, in the event that a first to a fourth sensing levels are set according to a pressure applied to a selected key, the image processing terminal 102 may determine an input to the normal input when the determination key 212 is pressed or touched with a pressure (or an area) corresponding to the first sensing level, and output the guide when the determination key 212 is pressed or touched with a pressure corresponding to a second sensing level. The image processing terminal 102 may output the popular channel list when the determination key 212 is pressed or touched with a pressure corresponding to a third sensing level, and output the favorite channel list when the determination key 212 is pressed or touched with a pressure corresponding to the fourth sensing level.

Figure 4:
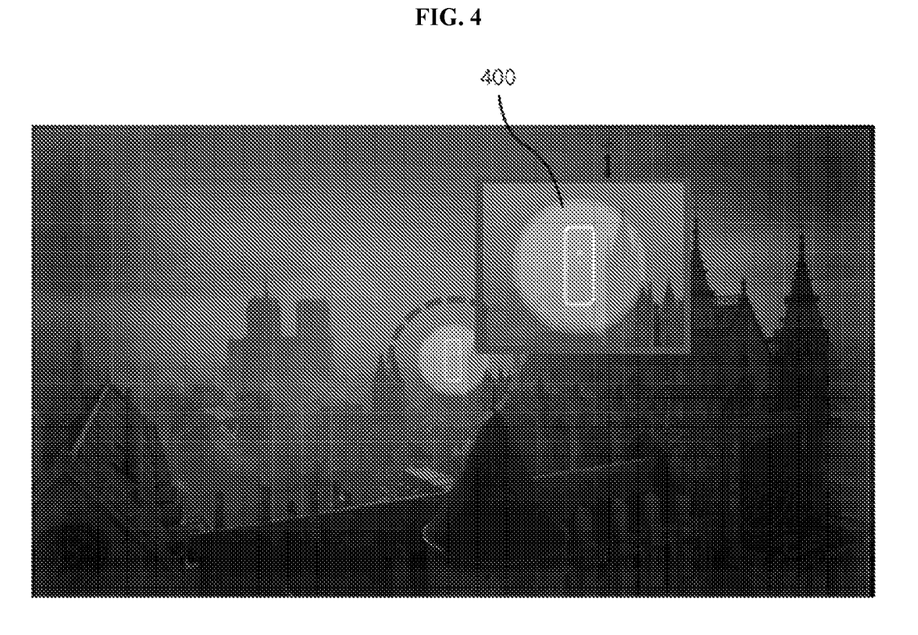
FIG. 4 is a view illustrating displaying of an identification image of a force input according to one embodiment of the invention.

As shown in FIG. 4, the image processing terminal 102 outputs an force input identification image on a screen so that the user can identify the force input, when it receives the control signal including the sensing level corresponding to the force input from the remote controller 104.

Here, the force input identification image 400 may be outputted on the screen during predetermined period of time after the force input is applied. Preferably, the force input identification image 400 may be displayed in a zoom out, i.e. with increasing its size during an operation execution waiting time in accordance with the force input.

Figure 5:
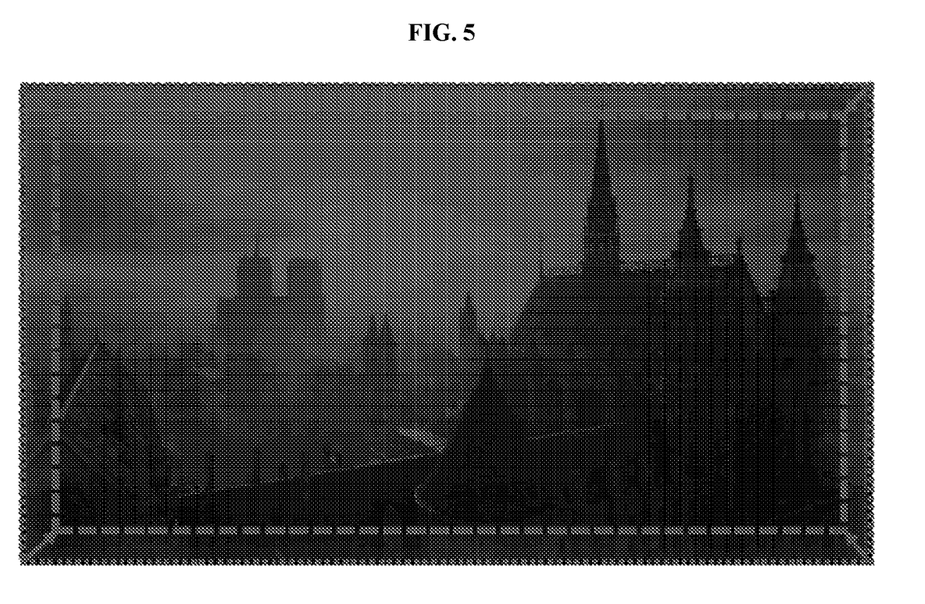
FIG. 5 is a view illustrating a process of adjusting a size of a screen when a force input is applied according to one embodiment of the invention.

In another embodiment, a size of the screen may be returned to an original size after it is reduced as shown in FIG. 5, instead of outputting the force input identification image.

Here, adjustment of the size of the screen may mean a process that the image processing terminal 102 adjusts a full size of the screen in a direction of z-depth, so that the user can feel spatial depth when the force input is applied.

The adjustment of the full size of the screen for the force input is not limited, but it may be implemented by various methods.

The force input identification image 400 of the present embodiment may include information about a function executed in response to the force input.

Figure 6A:
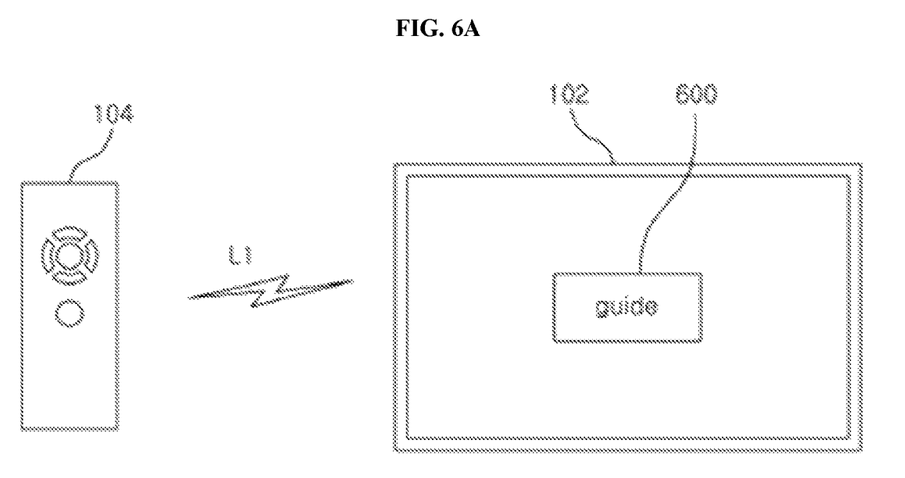
FIG. 6A and FIG. 6B are views illustrating images outputted depending on different force input according to one embodiment of the invention.
Figure 6B:
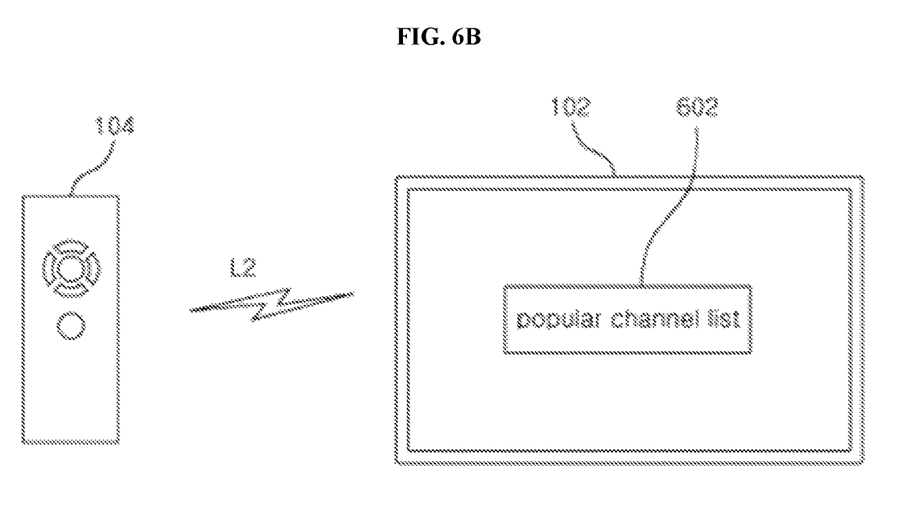

FIG. 6A and FIG. 6B are views illustrating images outputted depending on different force input according to one embodiment of the invention.

It is assumed in FIG. 6A and FIG. 6B that plural sensing levels are set for the force input about one key.

As shown in FIG. 6A, the image processing terminal 102 may output a guide icon 600 corresponding to a second sensing level on the screen during a certain time, when the force input corresponding to the second sensing level is applied while the user are viewing a live program.

As shown in FIG. 6B, the image processing terminal 102 may output a popular channel list icon 602 corresponding to a third sensing level on the screen during a certain time, when the force input corresponding to the third sensing level is applied while the user are viewing the live program.

The guide icon 600 or the popular channel list icon 602 in FIG. 6A and FIG. 6B may be the force input identification image, or the force input identification image may be zoom-out during the waiting time before execution of corresponding operation after the force input is applied as shown in FIG. 4.

Figure 7:
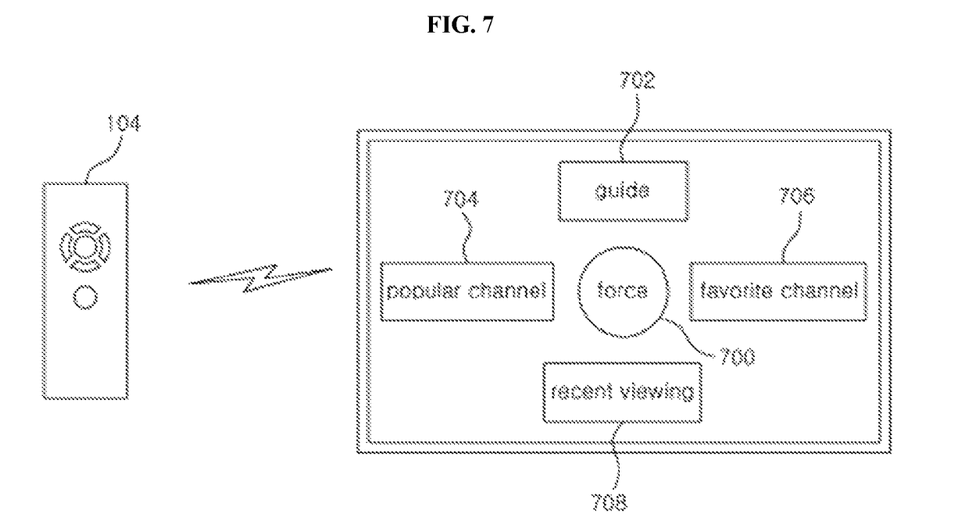
FIG. 7 is a view illustrating an image outputted when a force input is applied according to one embodiment of the invention.

In another embodiment, in the event that only sensing levels (i.e. two sensing levels) corresponding to the normal input and one force input are set about one key, the image processing terminal 102 may output together the force input identification image and an image (icon) for identifying plural functions on the screen.

As shown in FIG. 7, the image processing terminal 102 may display a force image identification image 700 for identification of the force input by the user, a guide icon 702, a popular channel list icon 704, a favorite channel list icon 706 and a recent viewing channel list icon 708 on the screen when the force input is recognized. Here, the guide icon 702, the popular channel list icon 704, the favorite channel list icon 706 and the recent viewing channel list icon 708 may be displayed in different directions, on the basis of the force input identification image 700.

Subsequently, the image processing terminal 102 executes a selected operation corresponding to a key input when the key input (for example, the normal input) corresponding to one direction is inputted through the navigation key 210.

Figure 8A:
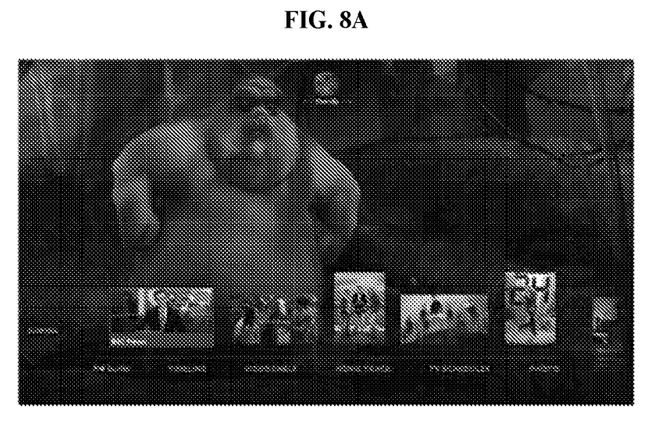
FIG. 8A and FIG. 8B are views illustrating separately entities applicable the force input from another entity according to one embodiment of the invention.
Figure 8B:
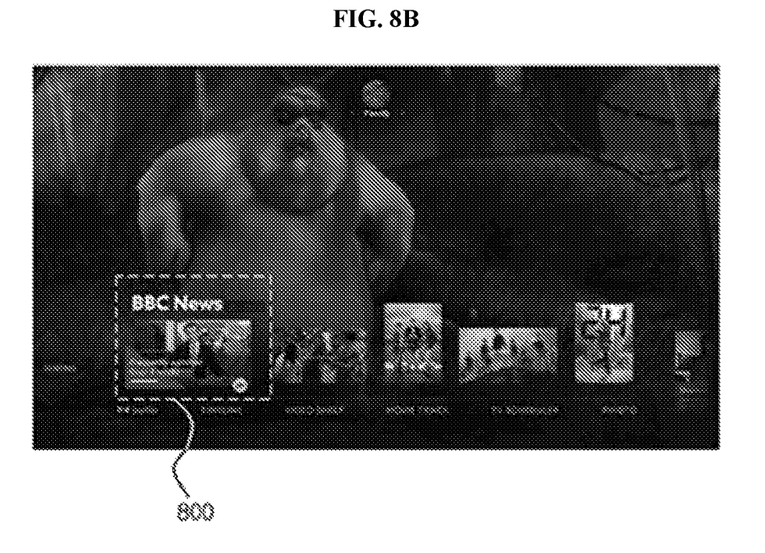

In one embodiment, the image processing terminal 102 may display the force input identification image and an entity 800, operable in response to the force input, on the screen after the force input is applied as shown in FIG. 8A and FIG. 8B, in the event that plural entities are displayed on the screen. The entity 800 may be separately displayed.

The image processing terminal 102 may give the spatial depth about the entity 800, operable in response to the force input, in the direction of the z-direction while the entities are displayed, as shown in FIG. 8A and FIG. 8B.

Applying the normal input to the determination key 212 while entities in a VOD list are being outputted as shown in FIG. 8A and FIG. 8B is generally determined as a selection of a program on which a cursor locates at present or a selection of a highlighted program.

In one embodiment, it is distinctively shown that an entity on which the cursor locates is an entity operable in response to the force input as shown in FIG. 8B, if the cursor moves to the entity operable in response to the force input under the above status.

Figure 9:
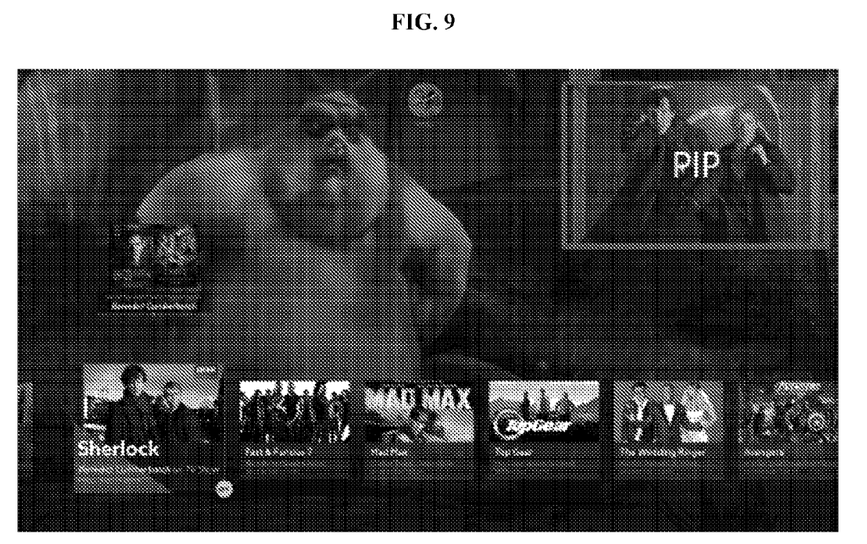
FIG. 9 is a view illustrating a process of outputting a PIP when a force input is applied for one of the entities.

In one embodiment, the image processing terminal 102 outputs a picture in picture PIP about a program on which the cursor locates as shown in FIG. 9, when the force input is applied to the determination key 212 while the cursor locates on the entity.

Hereinafter, the image processing terminal of the present embodiment will be described with reference to FIG. 10.

Figure 10:
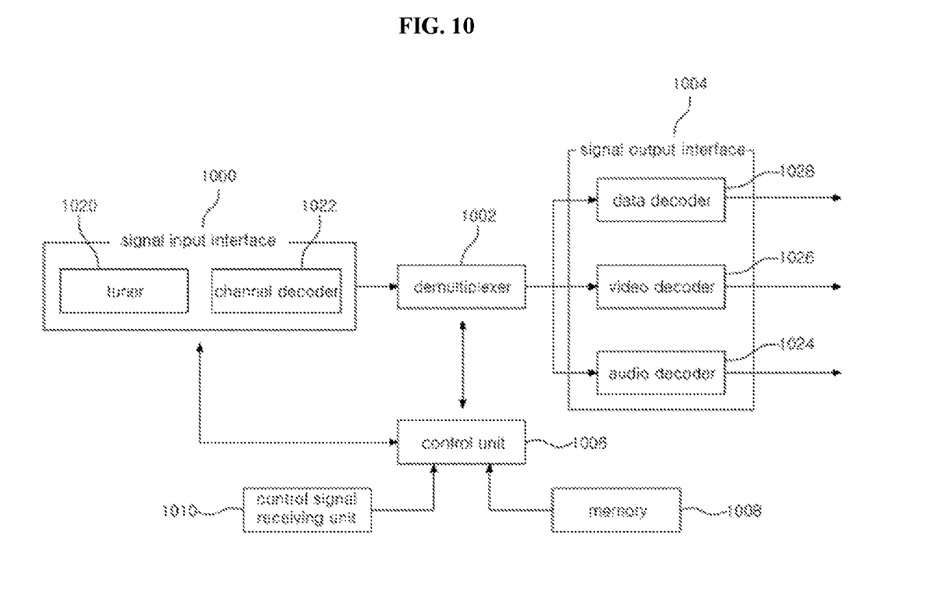
FIG. 10 is a view illustrating an image processing terminal according to one embodiment of the invention.

In FIG. 10, the image processing terminal 102 of the present embodiment may include a signal input interface 1000, a demultiplexer 102, a signal output interface 1004, a control unit 1006, a memory 1008 and a control signal receiving unit 1010.

The signal input interface 1000 includes a tuner 1020 for receiving a compressed broadcasting signal (a program of a channel selected by the user) and a channel decoder 1022 for extracting a channel desired by the user from the received broadcasting signal according to a control of the controller 1006.

The compressed (or encoded) broadcasting signal according to a compression standard through certain protocol may be at least one of a video signal, an audio signal or a data signal, or a complex signal of the video signal, the audio signal and the data signal. The video signal, the audio signal and the data signal are extracted and divided by the demultiplexer 1002, and then they are transmitted to the signal output interface 1004.

The signal output interface 1004 may include decoders corresponding to each of the signals, particularly an audio decoder 1024, a video decoder 1026 and a data decoder 1028. For example, the demultiplexer 1002 extracts the audio signal from a broadcasting signal of a desired channel, and transmits the extracted audio signal to the audio decoder 1024 of the signal output interface 1004. The audio decoder 1024 decodes the audio signal and then transmits the decoded audio signal in an analog to a user's speaker.

The video signal is decoded by the video decoder 1026 of the signal output interface 1004, and then the decoded video signal is transmitted to a display unit such as a television. In the event that the broadcasting signal is a complex signal including a video signal and an audio signal, the data signal is extracted and divided by the demultiplexter 1002. The data decoder 1028 decodes the data signal for data broadcasting, and the decoded data signal is transmitted to the display unit with be matched with the video signal by a graphic overlay.

In one embodiment, the data decoder 1028 operates to output an image corresponding to a force input through the display unit according to a control of the controller 1006, when the user applies the force input.

The controller 1006 may include a central processing unit CPU performable a computer program or a virtual machine, etc., and be defined as a general processor.

The control unit 1006 tunes to a channel requested by the tuner 1020 according to a user's channel select request, processes a broadcasting signal received through the selected channel and outputs the processed broadcasting signal on the display unit.

The control unit 1006 processes a broadcasting signal received through a network and outputs the processed broadcasting signal on the display unit.

The memory 1008 stores one or more program commands executable by the controller 1006.

The memory 1008 may include a non-volatile storage device such as a fixed hard driver or a detachable storage device. The detachable storage device may include a compact flash unit, an USB memory stick, etc. The memory 608 may include various volatile memories such as a random access memory.

In one embodiment, the memory 1008 stores program commands for processing a control signal received through the control signal receiving unit 1010.

The control signal transmitted from the remote controller 104 includes information concerning the key selected by the user and information concerning the sensing level.

The control unit 1006 determines whether or not the control signal including the sensing level corresponding to the force input is received from the remote controller 1004 through execution of the program commands. The control unit 1006 outputs the force input identification image on the screen, when the control signal includes the sensing level corresponding to the force input.

Components in the embodiments described above can be easily understood from the perspective of processes. That is, each component can also be understood as an individual process. Likewise, processes in the embodiments described above can be easily understood from the perspective of components.

Also, the technical features described above can be implemented in the form of program instructions that may be performed using various computer means and can be recorded in a computer-readable medium. Such a computer-readable medium can include program instructions, data files, data structures, etc., alone or in combination. The program instructions recorded on the medium can be designed and configured specifically for the invention or can be a type of medium known to and used by the skilled person in the field of computer software. Examples of a computer-readable medium may include magnetic media such as hard disks, floppy disks, magnetic tapes, etc., optical media such as CD-ROM's, DVD's, etc., magneto-optical media such as floptical disks, etc., and hardware devices such as ROM, RAM, flash memory, etc. Examples of the program of instructions may include not only machine language codes produced by a compiler but also high-level language codes that can be executed by a computer through the use of an interpreter, etc. The hardware mentioned above can be made to operate as one or more software modules that perform the actions of the embodiments of the invention, and vice versa.

The embodiments of the invention described above are disclosed only for illustrative purposes. A person having ordinary skill in the art would be able to make various modifications, alterations, and additions without departing from the spirit and scope of the invention, but it is to be appreciated that such modifications, alterations, and additions are encompassed by the scope of claims set forth below.

| [Description of reference numbers] | |
|---|---|
| 100: contents providing system | 102: image processing terminal |
| 104: remote controller | 210: navigation key |
| 212: function key | 214: determination key |

What is claimed is:

1. An image processing terminal, comprising:
a processor;
a memory configured to store one or more commands executed by the processor; and
a control signal receiving unit configured to receive a control signal in accordance with an input to a key by a user from a remote controller,
wherein the one or more program commands include commands for,
comparing a sensing level corresponding to a pressure or an area applied to the key by the user with a preset value, determining whether the input to the key corresponds to a normal input or a force input depending on the comparing,
outputting an identification image for identification of the force input on a screen during a predetermined period of time or adjusting a full size of the screen when the input to the key corresponds to the force input, and
performing a control process corresponding to the force input after the predetermined period of time elapses,
wherein the one or more program commands indicate and display separately an entity applicable the force input from an entity applicable only the normal input corresponding to a pressure or an area applied to the key by a value less than the preset value when a cursor moves, in the event that plural entities selectable through a movement of the cursor are displayed on the screen.

2. The image processing terminal of claim 1, wherein the one or more program commands output the identification image in a zoom-out on a certain area of the screen during a waiting time for execution of an operation in accordance with the force input.

3. The image processing terminal of claim 1, wherein the one or more program commands reduce a full size of the screen in a direction of z-depth during a waiting time for execution of an operation in accordance with the force input, and then returns the size of the screen to an original size.

4. The image processing terminal of claim 1, wherein the one or more program commands allow the identification image to include information for identifying a function executed by the force input.

5. The image processing terminal of claim 1, wherein the one or more program commands display an icon, corresponding to a function selectable through a normal input of a navigation key, near the identification image on the screen.

6. The image processing terminal of claim 1, wherein the image processing terminal is a set-top box for receiving a broadcasting signal from a contents providing system and outputting the received broadcasting signal.

7. The image processing terminal of claim 1, wherein the key includes at least one of a navigation key related to a directional key, a determination key or a function key, and
the one or more program commands execute an operation corresponding to an attribute different from an original attribute of a selected key, when the key is selected by a sensing level corresponding to a pressure or an area more than a preset pressure or area.

8. The image processing terminal of claim 1, wherein the sensing level includes a first sensing level corresponding to the normal input for executing an operation corresponding to an original attribute of the key and a second sensing level corresponding to the force input for executing an operation corresponding to an attribute different from the original attribute of the key.

9. A method for providing a force input identification service, the method comprising:
receiving a control signal in accordance with an input to a key by a user from a remote controller;
comparing a sensing level corresponding to a pressure or an area applied to the key by the user with a preset value, and determining whether the input to the key corresponds to a normal input and a force input depending on the comparing;
outputting an identification image for identification of the force input on a screen during a predetermined period of time or adjusting a full size of the screen when the input to the key corresponds to the force input;
performing a control process corresponding to the force input to the key after the predetermined period of time elapses; and
displaying and indicating separately an entity applicable the force input from an entity applicable only the normal input corresponding to a pressure or an area applied to the key by a value less than the preset value when a cursor moves, in the event that plural entities selectable through a movement of the cursor are displayed on the screen.

10. A non-transitory computer-readable storage medium storing instructions for performing the method of claim 9.

* * * * *